United States Patent
Coutat et al.

(10) Patent No.: US 6,168,357 B1
(45) Date of Patent: *Jan. 2, 2001

(54) TOOLHOLDER HAVING A CLAMPING ARM AND A SPACER FOR PREVENTING OVERCLAMPING

(75) Inventors: Jean-Guy Coutat, Bourges; Frederic Grognet, Marmagne, both of (FR)

(73) Assignee: Seco Tools AB, Fagersta (SE)

( * ) Notice: Under 35 U.S.C. 154(b), the term of this patent shall be extended for 0 days.

This patent is subject to a terminal disclaimer.

(21) Appl. No.: 09/151,099

(22) Filed: Sep. 10, 1998

(30) Foreign Application Priority Data

Sep. 10, 1997 (SE) .................................................. 9703261

(51) Int. Cl.$^7$ ........................................................ B23P 15/28
(52) U.S. Cl. ........................... 407/110; 407/107; 407/109
(58) Field of Search ................................... 407/110, 113, 407/109, 114, 115, 105–107

(56) References Cited

U.S. PATENT DOCUMENTS

| | | | |
|---|---|---|---|
| 3,060,554 | * 10/1962 | Kirchner | 407/110 X |
| 3,837,058 | * 9/1974 | Barkley et al. | 407/109 X |
| 3,844,008 | 10/1974 | Sletten . | |
| 4,480,950 | * 11/1984 | Kraft et al. | 407/103 |
| 4,827,995 | * 5/1989 | Wilson | 407/51 |
| 5,035,544 | * 7/1991 | Ikenaga et al. | 407/105 |
| 5,100,268 | * 3/1992 | Nakayama et al. | 407/109 X |
| 5,411,354 | * 5/1995 | Gustafsson | 407/110 |
| 5,733,073 | * 3/1998 | Zitzlaff et al. | 407/107 |
| 6,010,281 | * 1/2000 | Coutat et al. | 407/109 |

FOREIGN PATENT DOCUMENTS 1 720 803    3/1992  (SU) .

* cited by examiner

Primary Examiner—Henry W. H. Tsai
(74) Attorney, Agent, or Firm—Burns, Doane, Swecker & Mathis, L.L.P.

(57) ABSTRACT

A toolholder for holding a cutting insert, particularly for grooving and/or parting operations. The toolholder comprises a base and a clamping arm forming therebetween a pocket and a slot. The pocket is open at a front end thereof for receiving the cutting insert, and the slot extends rearwardly from a rear end of the pocket. A fastening screw extends through the slot from the clamping arm to the base for displacing the clamping arm toward the base in order to clamp the cutting insert within the pocket. A spacer is disposed in the slot for limiting an extent of movement of the clamping arm toward the base, thereby preventing overclamping of the clamping arm.

10 Claims, 4 Drawing Sheets

TOOLHOLDER HAVING A CLAMPING ARM AND A SPACER FOR PREVENTING OVERCLAMPING

RELATED INVENTION

This application is related to an invention disclosed in the inventors' concurrently filed U.S. application Ser. No. 09/151,097 filed Sep. 10, 1998 U.S. Pat. No. 6,010,281 (Attorney Docket No. 024444-533).

FIELD OF THE INVENTION

The present invention relates to a toolholder for chip removing machining, preferably for grooving or parting, and a method of attaching a cutting insert in a toolholder.

PRIOR ART

In U.S. Pat. No. 3,844,008 a tool of the above mentioned type is described. A clamp is activated by a screw for clamping the cutting insert in an insert pocket. Often when the screw is tightened the operator over-torques or over-tightens the screw such that the clamp undergoes a plastic deformation. The plastic deformation of the clamp leads to a less accurate clamping for the next insert to be used since the clamp has been distorted.

In Soviet Application No. A1-1720803 there is shown a tool for mounting a self-wedging insert wherein the minimum height of the insert pocket for accuracy reasons is determined by means of an adjustable threaded sleeve. In practice, an insert is inserted into an insert pocket formed between a base and a clamping arm. A fastener screw is then rotated to fix the insert in place. Then, the sleeve is rotated and caused to move upwardly through the base and into engagement with the bottom of the clamping arm. After that, the fastener screw is finally tightened. As a result, the threaded sleeve defines the position of the clamping arm so that the pocket obtains a correct height relative to a self-wedging cutting insert.

OBJECTS OF THE INVENTION

One object of the present invention is to provide a rigid tool preferably for thin holders and thin cutting inserts.

Another object of the present invention is to provide a tool in which the clamp is not distorted.

Still another object of the present invention is to provide a tool in which the clamping arm is protected from plastic deformation.

These and other objects have been achieved by a tool as defined in the appended claims with reference to the drawings.

SUMMARY OF THE INVENTION

The present invention relates to a toolholder for holding a cutting insert. The toolholder comprises a base and a clamping arm connected to the base. The base and the clamping arm form therebetween a pocket and slot. The pocket has opposing surfaces and is open at a front end thereof for receiving a cutting insert. The slot extends rearwardly from a rear end of the pocket. The clamping arm is elastically biased to a position wherein the surfaces of the pocket are spaced apart. A fastening screw is provided for displacing the clamping arm toward the base against the elastic bias for clamping a cutting insert between the surfaces of the pocket. A non-adjustable spacer of fixed height is disposed in the slot for limiting an extent of movement of the clamping arm toward the base.

The invention also pertains to a method of attaching the cutting insert to the tool holder. In the method, after the cutting insert has been inserted loosely into the pocket, the fastening screw is rotated to displace the clamping arm toward the base to create an initially tightened contact between the cutting insert and the pocket surfaces, with the clamping arm being in non-engagement with a spacer disposed in the slot to form a gap therewith. Then, the fastening screw is further rotated to finally tighten the contact and cause the clamping arm to be elastically deformed in the region of the gap, whereby the gap is closed and the spacer prevents further displacement of the clamping arm toward the base.

DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
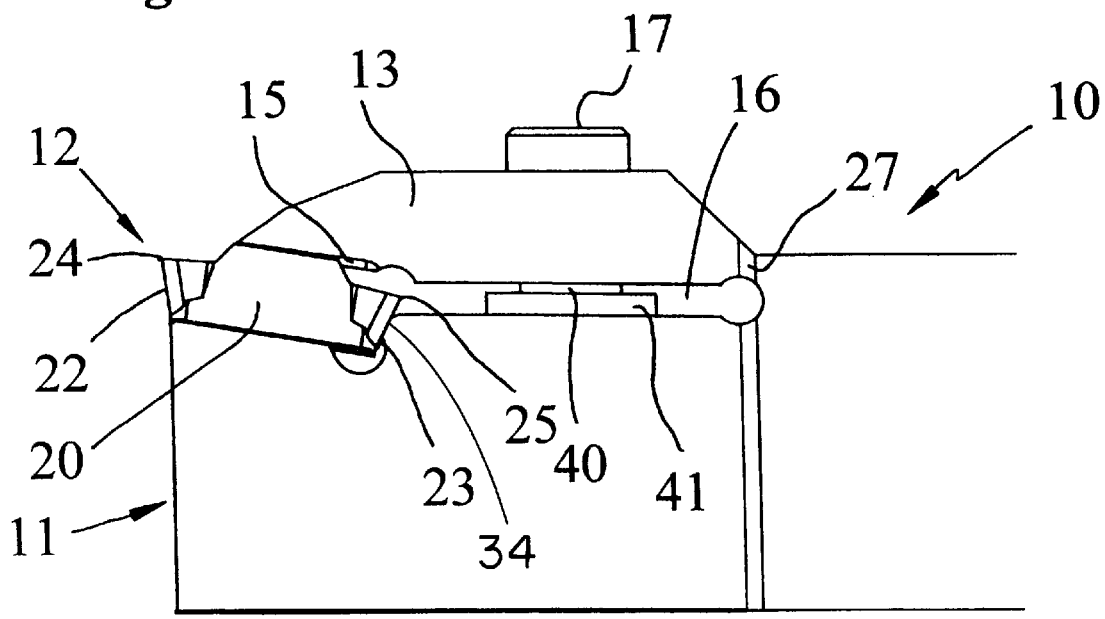
FIG. 1 shows a tool according to the present invention, in a side view.

With reference to FIGS. 1–5, there is shown a tool 10, including a holder 11 and a cutting insert 12. The holder 11 is of the type where a base of the body forms a lower side 19 of the pocket 14. A clamping arm 13, integrated with the holder, constitutes an upper side 15 of the insert pocket 14. The arm is movable in cantilever fashion about a portion of the holder which defines a pivot 27 by means of a fastening screw 17, the movement being accommodated by a slot 16. The slot 16 connects with a rear end of the cutting insert pocket. The slot extends in the longitudinal direction of the cutting insert for an appropriate distance beyond the screw 17. The screw 17 as seen in FIG. 3A is provided substantially in the middle of the elongated slot 16. The screw 17 fits into a threaded boring 45 which has a center axis CL. An abutment surface 34 is provided in connection with the lower border line of the slot 16, wherein the surface 34 constitutes a stop for the cutting insert in its longitudinal direction. The slot 16 extends rearwardly from the surface 34.

The upper side 15 has a generally convex V-shaped cross-section forming a projection with flanks 15a, 15b converging towards the cutting insert. The flanks form an obtuse, internal angle a with each other, which lies in the interval 120° to 160°. A clearance surface is provided between the flanks (i.e., at the peak of the V-shape) in order to avoid a central contact with the cutting insert. The arm is intended to clamp the cutting insert against the lower side 19 of the cutting insert pocket.

Figure 2:
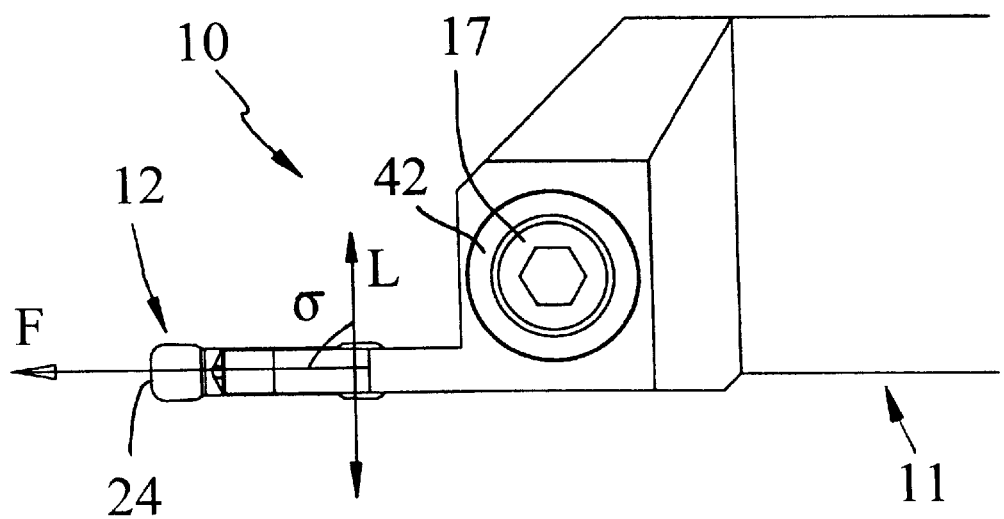
FIG. 2 shows the tool in a top view.

The lower side 19 is formed with a number of separate, identical grooves 26, which in cross section describe a substantially trapezoidal path. The grooves are elongated and extend along the entire lower side 19 in a front-to-rear direction. The direction F, which is the feed direction when the tool is used as a parting tool, and the direction L, which is the feed direction when the tool is used as a tool for longitudinal turning, are shown in FIG. 2. The angle a between the directions F and L can be 90°±15°. The groove 26 further has two flanks which connect to the groove bottom via a sharp or rounded transition. The flanks form an acute angle with each other, The cutting insert 12 comprises an upper surface 18 and a lower surface 29 interconnected by side surfaces 20, 21, 22, 23, wherein the lines of intersection between the side surfaces 22, 23 and the upper surface 18 form cutting edges 24, 25. The cutting insert is preferably somewhat wider than the cutting insert pocket, for the sake of clearance. The length of the insert edge 24 is shorter than the height of the cutting insert as measured between upper and lower surfaces 18, 29. The upper surface has a slot formed by two flanks 18a, 18b which converge towards the lower surface 29 with an external single substantially corresponding to the above-mentioned internal angle $\alpha$. The lower side is formed by a number of separate, substantially, identical ridges 30. The ridges form a substantially sinusoidal curve. The ridges are elongated and extend along the entire lower side 29 in a front-to-rear direction. The ridge 30 has two flanks 30a, 30b which connect to a bottom 31. The flanks form an acute angle with each other.

As described thus far, the apparatus corresponds to the prior art. The tool according to the present invention however, further comprises an externally threaded sleeve or set screw 40, an annular member or a spacer 41 and a washer 42, all being substantially symmetrically positioned relative to the axis of the screw 17. The axis of the screw 17 is substantially perpendicular to the slot 16. The set screw 40 includes a cylindrical portion 40a which threads into a complementary, threaded boring 44 in the holder. A flange 43 is disposed at a free end of the cylindrical portion 40a. The set screw flange 43 and a shoulder 40b of the boring cooperate to define the maximum height of the insert pocket.

Figure 3A:
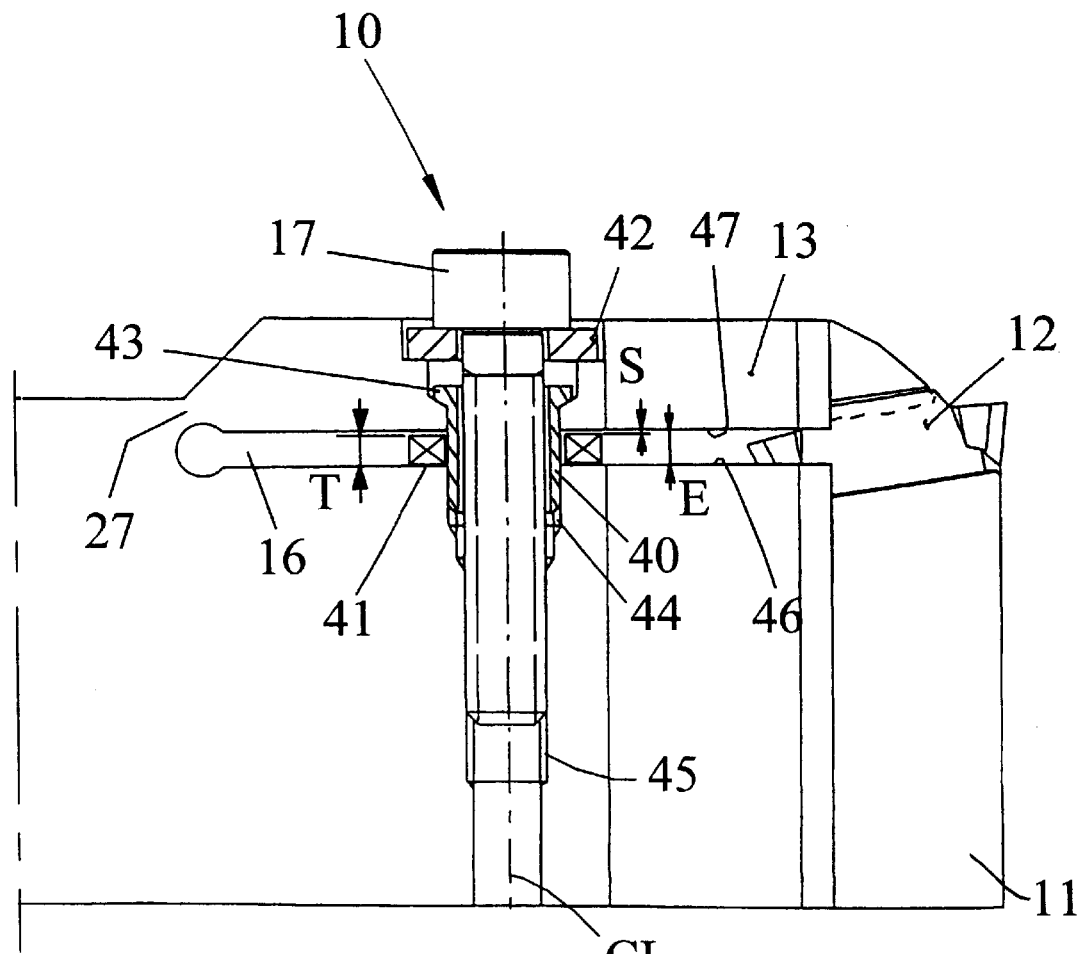
FIG. 3A shows the tool in another side view, partly sectioned in an open position.
Figure 3B:
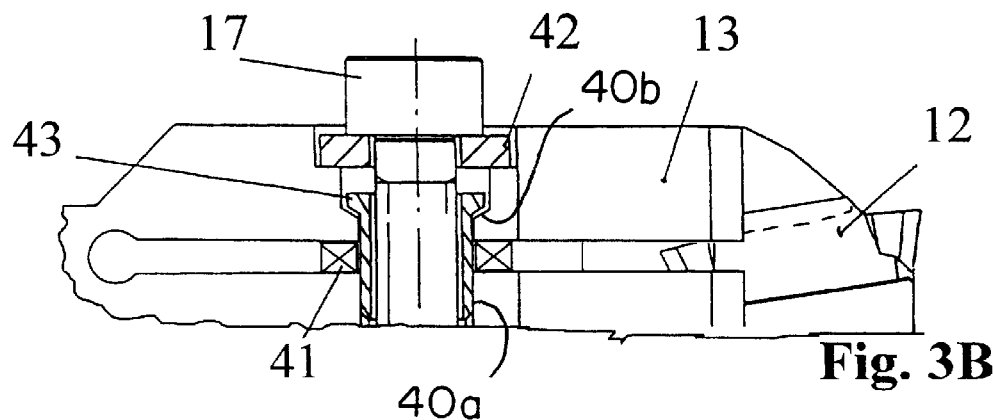
FIG. 3B shows the tool in a clamped position.
Figure 5:
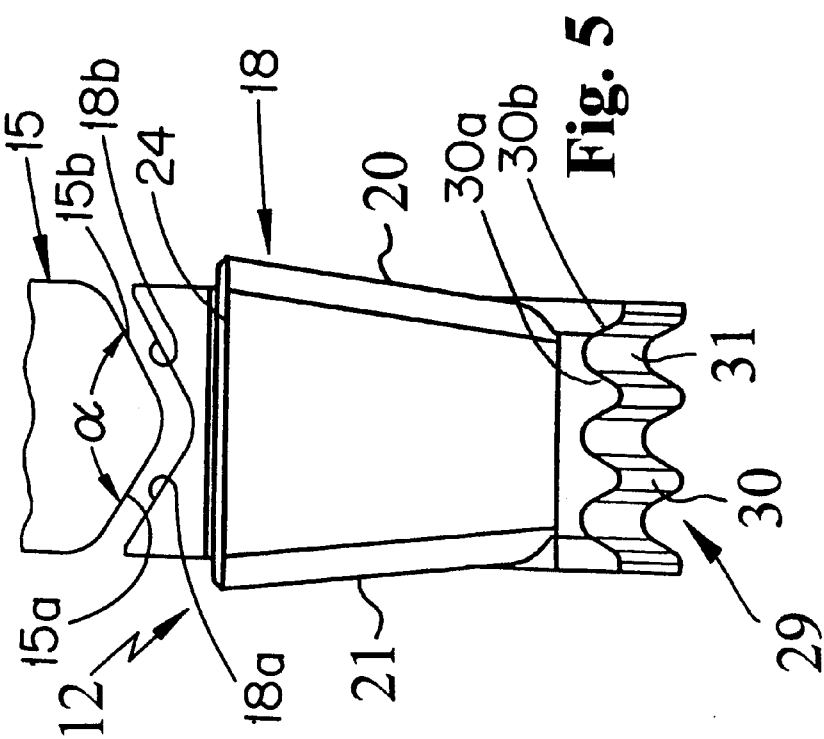
FIG. 5 shows a cutting insert to be used in the tool in a front view.
Figure 4:
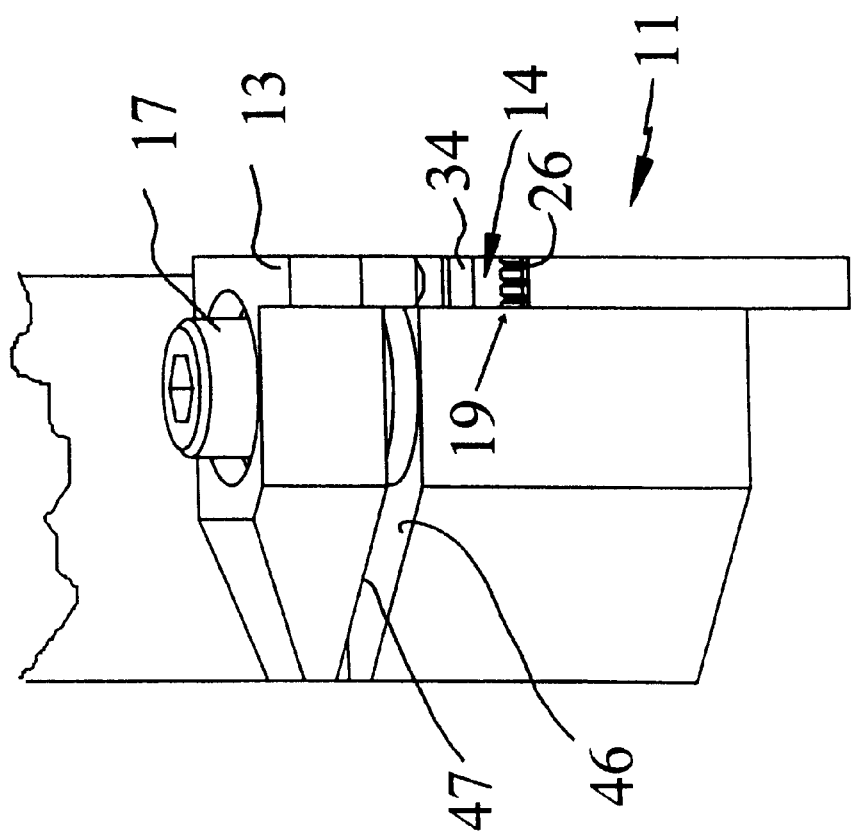
FIG. 4 shows a holder in a front view.

The spacer 41 is preferably a metallic circular ring of fixed height which is positioned in the slot 16 coaxially around the set screw 40. The spacer 41 is positioned where the clamp means 13 bends the most during clamping of the insert, i.e., in the middle of the slot 16. The maximum height of the slot 16 is depicted by E. The thickness of the spacer 41 is depicted by T, which is a distance S thinner than the height E. The distance or gap S allows the arm 13 to deform elastically to a certain extent during final tightening of the screw 17, i.e., the gap S is provided to be closed during tightening of the screw 17 as shown in FIG. 3B.

The provision of the washer 42 allows the threaded shank of the screw 17 to come into threaded engagement with the boring in the holder, but will stop the head of the screw 17 from reaching the set screw 40 during tightening. In order to avoid confusion of an operator in distinguishing the washer 42 from the spacer 41, the internal diameter of the spacer 41 is larger than the internal diameter of the washer 42.

Assembly of the tool according to the present invention is done as follows, preferably at the tool manufacturing site. The spacer 41 is aligned with the center axis CL within the slot 16 on the slot floor 46. The spacer is not supposed to project from the slot outside of the tool and it will not extend to or interfere with the insert pocket. Then the set screw 40 is screwed into the boring 44 through the spacer, using a special turning tool which engages the flange 43. When the set screw flange 43 abuts the annular shoulder 40b in the arm 13, the arm will be forced to close the slot 16 somewhat. A conventional reference insert, i.e., a non-working gauging insert of the type "Go/No go" for sizing a pocket height is inserted in the pocket, and the set screw 40 is tightened until only the "Go" part of the insert can be inserted but not the "No go" part. The upper position of the arm 13, i.e., the maximum height E, is thus determined. If desired, the set screw could be provided with a thread lock means to avoid accidental displacement thereof. Then the fastening screw 17 is inserted through the washer 42 and inserted into the boring 45 and tightened somewhat.

After the thus-assembled unit is shipped to a purchaser, an operator can untighten the screw 17, whereupon the pocket achieves its maximum permitted height, i.e., the height of the cutting insert pocket 14 is increased by the release of stored elastic energy in the arm 13 until the shoulder 40b abuts the flange 43. Therefore, the shoulder 40b and the flange 43 form mutually engageable stop surfaces. Thus, excessive opening of the slot producing plastic deformation of the clamping arm, is avoided, even as a working cutting insert is inserted into the pocket such that associated ridges 30 and grooves 26 come into engagement with each other. When the insert pocket is at its maximum allowed height, the insert cannot be inserted unless the V-shaped upper side 15 of the insert pocket is aligned with the slot formed in the upper surface of the insert. Therefore, in such an instance, the insert can only be inserted in a proper lateral relationship with the serrations 26 of the lower surface of the pocket. As the cutting insert is inserted, it is guided by said engagement, until the insert inner edge surface 23 abuts against the abutment surface 34. Subsequently the screw 17 can be screwed-down such that the flanks of the arm 13 abut against associated flanks on the cutting insert, whereby the ridges are firmly pressed against the grooves. To avoid overclamping of the arm 13 resulting in insert breakage or permanent distortion of the arm the calibrated spacer 41 is used. That is, when the screw 17 is finally tightened and the insert is firmly clamped, the screw may be further tightened only until there is no longer a gap S between the arm 13 and the spacer 41. In that position the ceiling 47 of the slot abuts the spacer and thus prevents further tightening of the screw. When the insert is to be replaced or indexed, only the screw 17 is untightened such that the gap S will reappear at the position shown in FIG. 3.

Figure 6:
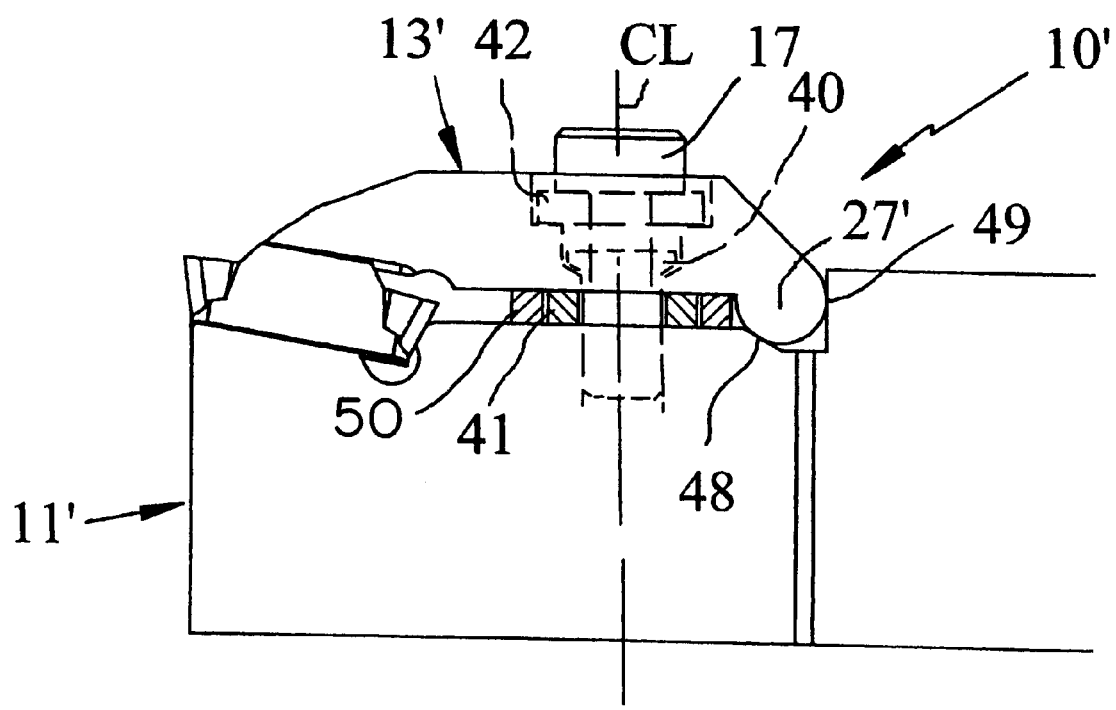
FIG. 6 shows an alternative embodiment of a tool according to the present invention in a side view.

In FIG. 6 there is shown an alternative embodiment of a tool 10' according to the present invention, wherein a separate plate 13' is provided and is fastened on a holder 11' of the tool. In this case the pivot 27' is constituted by two abutment lines or surfaces 48, 49. The cutting insert is clamped in the same way as described above except that there is no stored elastic energy in the clamping arm. The elastic energy is then preferably provided by a separate spring such as a washer 50 which is disposed radially outside of the spacer and in surrounding relationship thereto. The spring washer is compressed when the insert is clamped and is operable to raise the arm 13 when the fastening screw is loosened.

It should be understood that the sleeve 40 in some cases could be omitted, for example if the arm is very stable. Also if the head of the screw 17 is of larger diameter than shown, then the washer 42 can be omitted. Furthermore, the spacer means 41 for restricting overclamping of the clamp arm 13 could alternatively be integrated with either the clamp arm 13 or the tool holder body 11 at a location close to the screw means, instead of being separate therefrom. When the fastening screw 17 is loose, a gap would be created between the spacer and either the arm 13 or the base of the body 11.

The tool according to the present invention provides the advantages of optimal looking force on the insert thereby avoiding breakage or permanent distortion of the clamp, and trouble-free locking mechanism also if the locking screw is over-torqued.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A toolholder for holding a cutting insert, comprising:

a base and a clamping arm connected to the base, the base and the clamping arm forming therebetween a pocket and a slot, the pocket having opposing surfaces and being open at a front end thereof for receiving a cutting insert, the pocket having a rear abutment surface to be contacted by a cutting insert, the slot extending rearwardly from the rear abutment surface, the clamping arm being elastically biased in a direction wherein the surfaces of the pocket are urged away from one another;

a fastening screw for displacing the clamping arm toward the base against the elastic bias for clamping a cutting insert between the surface of the pocket;

a non-adjustable spacer of constant fixed height disposed in the slot for limiting an extent of movement of the clamping arm toward the base, the clamping arm being out of engagement with the spacer when the surfaces of the pocket are spaced apart sufficiently to afford insertion or removal of a cutting insert.

2. The toolholder according to claim 1 wherein the spacer is located adjacent a location of greatest bending of the clamping arm during an insert-clamping operation.

3. The toolholder according to claim 1 wherein the spacer is situated substantially midway along a length of the slot.

4. The toolholder according to claim 1 wherein the spacer is separable from both the base and the clamping arm.

5. The toolholder according to claim 1 wherein the fastening screw extends through the slot from the clamping arm to the base, the spacer surrounding the fastening screw.

6. The toolholder according to claim 5 wherein the spacer is ring-shaped.

7. The toolholder according to claim 5 wherein the fastening screw extends perpendicular to the slot.

8. The toolholder according to claim 1 wherein the base and the clamping arm are of one-piece integral construction.

9. The toolholder according to claim 1 wherein the clamping arm is separable from the base, and a spring is provided for elastically biasing the clamping arm.

10. The toolholder according to claim 1 further including a cutting insert contacting the rear abutment surface.

\* \* \* \* \*